(12) United States Patent
Hartikainen et al.

(10) Patent No.: US 6,226,633 B1
(45) Date of Patent: *May 1, 2001

(54) METHOD OF FORMING A USER INTERFACE FOR A TELECOMMUNICATIONS EXCHANGE

(75) Inventors: Eeva Hartikainen, Helsinki; Asko Suorsa, Vantaa; Leena Sivola, Espoo, all of (FI)

(73) Assignee: Nokia Telecommunications Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/930,824
(22) PCT Filed: Apr. 12, 1996
(86) PCT No.: PCT/FI96/00203
§ 371 Date: Oct. 10, 1997
§ 102(e) Date: Oct. 10, 1997
(87) PCT Pub. No.: WO96/32792
PCT Pub. Date: Oct. 17, 1996

(30) Foreign Application Priority Data

Apr. 13, 1995 (FI) .......................................... 951804

(51) Int. Cl.[7] ............................................ G06F 17/30
(52) U.S. Cl. ................... 707/4; 707/10; 707/204; 379/10; 379/15; 379/269; 379/279; 700/3; 700/82; 709/248; 714/12
(58) Field of Search ............................ 307/4; 707/4, 531, 707/204, 10; 704/8; 379/12, 10, 15, 269, 279; 700/3, 82; 709/248; 714/12

(56) References Cited

U.S. PATENT DOCUMENTS 4,595,980 * 6/1986 Innes .
4,782,506 * 11/1988 Sevcik ................................... 379/10

(List continued on next page.)

FOREIGN PATENT DOCUMENTS

93/18598   9/1993   (WO) .
94/10625   5/1994   (WO) .

OTHER PUBLICATIONS

International Telecommunication Union, Telecommunication Standardization Sector of ITU; Man–Machine Dialogue Procedures; Recommendation Z.317, pp. 1–21.

(List continued on next page.)

Primary Examiner—Hosain T. Alam
Assistant Examiner—Jean M. Corriélus
(74) Attorney, Agent, or Firm—Pillsbury Winthrop LLP

(57) ABSTRACT

A user interface for a telecommunication exchange in which the user gives control commands via the interface from an external terminal to the telecommunication exchange of which commands at least some are associated with parameters. The user interface includes control software which forwards the control command supplied by the user to the exchange for execution and gives the user instructions relating to the commands. In order that the user interface could more easily be transferred in a changed environment, the data on the types and the allowed value ranges of the parameters of the commands used in the user interface and the alphanumerical data relating to the instructions given to the user are separated from a program code of the control software into a separate database. The control software also includes a server program block communicating with the database block, as a response to a check request it has received, which checks the data the user has supplied to the exchange and as a response to an instruction request, generates instruction to be given to the user at each time.

8 Claims, 4 Drawing Sheets

U.S. PATENT DOCUMENTS

| | | | | |
|---|---|---|---|---|
| 5,251,125 | * | 10/1993 | Karnowski et al. | 364/189 |
| 5,278,978 | * | 1/1994 | Demers et al. | 395/600 |
| 5,347,564 | * | 9/1994 | Davis et al. | 379/12 |
| 5,416,917 | * | 5/1995 | Adair et al. | 395/500 |
| 5,428,772 | * | 6/1995 | Merz | 707/4 |
| 5,566,332 | * | 10/1996 | Adair et al. | 395/600 |
| 5,621,875 | * | 4/1997 | Mason et al. | 707/531 |
| 5,802,513 | * | 9/1998 | Bowie | 707/3 |
| 5,940,790 | * | 8/1999 | Vesterinen | 704/8 |

OTHER PUBLICATIONS

International Telecommunication Union, Telecommunication Standardization Sector of ITU; Introduction to the Extended MML For Visual Display Terminals; Recommendation Z.321; p. 1.

International Telecommunication Union, Telecommunication Standardization Sector of ITU; Capabilities of Visual Display Terminals; Recommendation Z.322, pp. 1–7.

International Telecommunication Union, Telecommunication Standardization Sector of ITU; Man–Machine Interaction; Recommendation Z.323, pp. 1–35.

International Telecommunication Union, Telecommunication Standardization Sector of ITU; Introduction to the Specification of the Man–Machine Interface; Recommendation Z.331; pp. 1–9.

International Telecommunication Union, Telecommunication Standardization Sector of ITU; Mehtodology for the Specification of the Man–Maching Interface—. . . ; Recommendatio.

International Telecommunication Union; Telecommunication Standardization Sector of ITU; Methodology for the Specification of the Man–Machine Interface— . . . ; Recommendation Z.333. pp. 1–18.

International Telecommunication Union; Telecommunication Standardization Sector of ITU; Subscriber Administration; Recommendation Z.334; pp. 1–21.

International Telecommunication Union; Telecommunication Standardization Sector of ITU; Routing Administration; Recommendation Z.335; pp. 1–17.

International Telecommunication Union; Telecommunication Standardization Sector of ITU; Traffic Measurement Administration; Recommendation Z.336; pp. 1–39.

International Telecommunication Union; Telecommunication Standardization Sector of ITU; Network Management Administration; Recommendation Z.337; pp. 1–23.

International Telecommunication Union; Telecommunication Standardization Sector of ITU; Glossary of Terms; Recommendation Z.341; pp. 1–46.

* cited by examiner

METHOD OF FORMING A USER INTERFACE FOR A TELECOMMUNICATIONS EXCHANGE

This application is the national phase of international application PCT/FI96/00203, filed Apr. 12, 1996 which was designated the U.S.

FIELD OF THE INVENTION

The present invention relates to a method for forming a user interface and a user interface for a telecommunication exchange. The user interface is especially intended for exchanges, but the same basic solution can also be applied to other objects of use.

BACKGROUND OF THE INVENTION

As shown in FIG. 1, exchanges comprise an Operations and Maintenance Unit (OMU), which handles operations related to the use and maintenance of the exchange. Exchanges may be connected via an OM unit to an operations and maintenance network (O&M network) through which the operator may administer several physically remote exchanges in a centralized way from one place. The OM unit of the exchange collects alarms and generates alarm reports and it also co-operates with the main memory (not shown) of the exchange into which files on subscribers, charging, signalling, routing and exchange configuration are stored, whereby the operator can read and change the contents of these files.

In practice, the hardware of the OM unit comprises a central processing unit CPU and one or more hard disk units as a separate mass memory and one or more diskette units.

The programs of the OM unit and the data terminal of the operator connected directly to the OM unit or via the O&M network form a user interface between the exchange and the operator known as MMI (Man Machine Interface). This user interface comprises the components shown in FIG. 1, which include, e.g., the data terminal (DT) which communicates with the OM unit OMU of an exchange EX, several MML controllers 12, which are program blocks located in the memory/on the disk of the OM unit, and a processor block 13, which is a program block located in the memory/on the disk of the OM unit (or possibly of another computer unit of the exchange) and connected to the actual call control. A single MML controller 12 attends to the execution of specified commands, whereby information is encoded into the MML controller concerning these commands as to how to instruct the user, what kind of values the parameters given by the user should have, in what way an execution command is transmitted to the processor block, and in what way the values given by the user should be expressed in the execution command.

The operator issues commands via the data terminal DT to the exchange by using a command language MML (Man-Machine Language) known as I/O syntax, which is specified in recommendations Z.317–Z.341 of ITU-T (formerly, CCITT). In the MML language, there is a command for each function. The software is hierarchial; at the beginning of a session it is on a main level, whereby a list of command classes appears on the display screen. The command classes form a command class level, whereby by selecting one command class from the main level, a menu is displayed for the user of the command groups of that class (which form the next level). Each command group comprises 4 to 8 commands, whereby by selecting the desired command group, the desired command can be realized. The division is functional so that a command class is responsible for one function block, such as the commands for subscriber management or routing (cf., S or R in FIG. 2). A command group is responsible for a smaller selection of commands related to one other, such as commands relating to the abbreviated number selection of a subscriber. The software is based on menus and the operator is instructed step by step by the menu towards the right command. The MMI user control interface enables several simultaneous command sessions into the same system. The sessions are totally independent of one other, but the simultaneous manipulation of the same information from different sessions is barred.

FIG. 2 shows the menu on the main level. It discloses the name of the command class in plain text form next to the letter, whereby one can enter the command group menu of the command class by selecting the letter and there similarly one enters the commands of the group by selecting the letter of the desired command group. After this, the command may be written out. The command form could be for example "ZRCI:GSW:NCGR=OUTGRP;". The command comprises the command letters, here ZRCI and the parameter blocks following them separated by a colon. One parameter block may comprise more than one parameter, these parameters being separated by a comma. When the user supplies only the command letters, which ends by pressing the return key, the MML controller gives in text form information as to what kinds of parameters can possibly be used. After giving each parameter, it is also possible to obtain instructions relating to the next parameter. The MML program gives instructions to the operator on all levels, wherefore the operator very seldom needs to consult a manual. Giving commands does not require any special skills, but the only requirement is naturally that the operator understands the language in which the on-line instructions in text form are on the display screen.

The known user interface of FIG. 1 operates as follows. When the user gives an MML command as described above, the MLL controller 12 responsive to the given character sequence is initiated and starts communicating with the user via the terminal DT. The help menus displayed by the terminal DT and the information required for checking the values of the parameters have been encoded into the MML controller (into a program code). When the MML controller is "satisfied" with the parameters it has received from the user, it generates a message on the basis of the parameters it has received and sends it to the processor block 13. The processor block updates the data contained in the message it received from the MML controller into its own parameter data to be used in connection with call control. After having updated the data, the processor sends an acknowledgement to the MML controller that will further notify the user.

A disadvantage of the known user interface described above is its poor flexibility in situations of change. This disadvantage is especially apparent in an intelligent network environment in which new services are constantly being created for the subscribers. The addition of a new service requires corresponding additions to the user interface so that the service could be controlled. At present, MML controllers are part of a larger software of the exchange, which means that changes in the user interface require changes in the software.

When some changes are to be made to the user interface (that is, to a MML command intended for the control of the exchange), for example, only some parameters are to be added or the allowed value range of the parameters or the help texts for the user are to be changed, the MML command has to be re-encoded and recompiled along with the rest of the software package. If it is necessary, for example, to enable a new command letter, the whole software package has to be updated.

SUMMARY OF THE INVENTION

The object of the present invention is to obviate the disadvantages mentioned above and to implement a more flexible user interface than before that can easily be adapted to a new operational environment or situation. This object is achieved by the present invention in a method for forming a user interface for a telecommunication exchange; and a user interface for a telecommunication exchange.

The present invention transfers the "intelligence" of the user interface (that is, the information connected to the operation of the user interface) into a separate database, whereby the operationality of the user interface can be changed without changes in the program code. In practice this "intelligence" means that at least the types and the allowed value ranges of the used parameters (i.e., the semantics of the parameters) and the texts related to the help texts displayed for the user are stored into the database. In addition to this, the database also preferably contains execution instructions informing the part of the user interface conducting the database inquiry what should be done in response to each command.

Changes or new features of the user interface can be implemented as changes/additions to the database. The operation of the user interface can thus be changed by definitions made into the database, whereby programming can be left out. Extensive software changes can, therefore, be replaced by changes in the information stored into the database, which changes are essentially easier to carry out.

The solution according to the invention affords new services to the exchange during operation as the additions of services may be realized only as additions of information to the database.

The solution according to the invention is also advantageous in that the user interface can be very flexibly transferred to a different environment. The database may even during operation control the forming of a user interface into several environments (e.g., Unix and PC based environments).

BRIEF DESCRIPTION OF THE DRAWINGS

In the following, the invention and its preferred embodiments are described in more detail with reference to the examples of FIGS. 3a, 3b and 4 in the accompanying drawings in which

FIG. 3a illustrates how the user interface shown in FIG. 1 changes when implemented in accordance with the invention. In accordance with the invention, the "intelligence" contained in known MML controllers has been transferred to a separate database DE containing at present information on what kind of user interface it concerns and how it operates.

Data is stored into the database relating to the services the user interface provides and the commands and parameters associated with each service and the allowed values of each parameter. Alphanumerical data needed for displaying the help texts for the user via the terminal DT is also stored into the database. The read and write procedures conducted into the database are attended by a separate server program block 33 which on the basis of the data it has received from the database on the one hand communicates with MML controllers 32 and on the other hand with (one or more) processor blocks 13. The MML controllers 32 are implemented as general program blocks attending in one traffic direction only to the display of messages received from the server program block for the user and in the other traffic direction transmit service requests to the server program block. The MML controllers are thus made into as simple blocks as possible due to which the user interface can easily be changed into another equipment environment (by changing the MML controller into a user interface block suitable for said environment)

In addition to the semantic checks of help texts and parameters in accordance with the preferred embodiment of the invention, data is stored into the database relating to which processor block and what data should be sent by the server in response to a specified MML command. Depending on the implementation, there may be several separate processor blocks 13; typically, there is one for each service. (The basic idea of invention can also be implemented in a case of only one processor block.) In accordance with the preferred embodiment of the invention there is data in the database not only on how a MML command is given correctly but also data on what to do in response to the command.

When a new command is introduced into the exchange, records having the command (or letters identifying it) as the key are added into the database. The records contain information on the help texts and semantics of the new command and what should be done as a response to the new command (generally, a message is sent to some process and an acknowledgement is received.)

Figure 1:
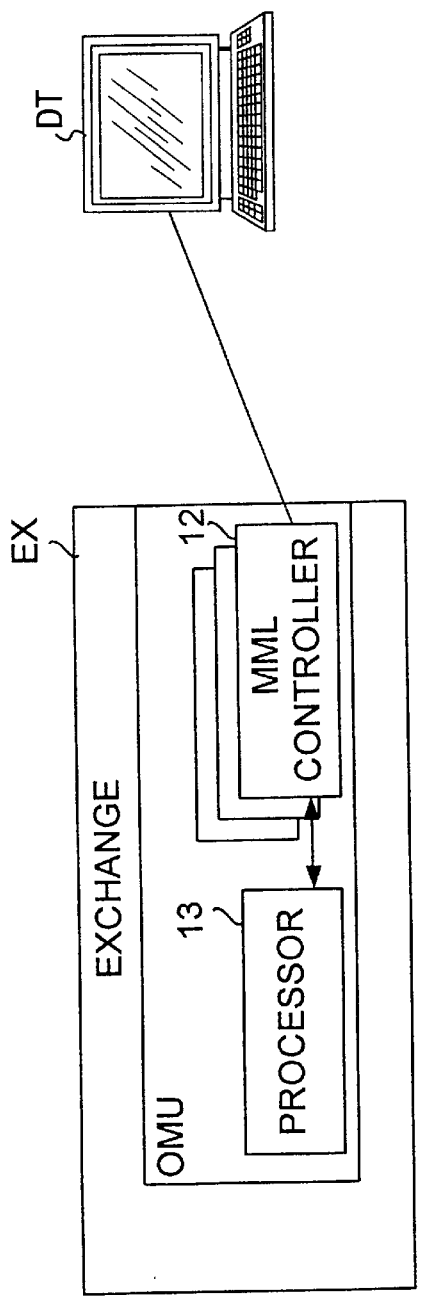
FIG. 1 illustrates a known user interface of an exchange.
Figure 3A:
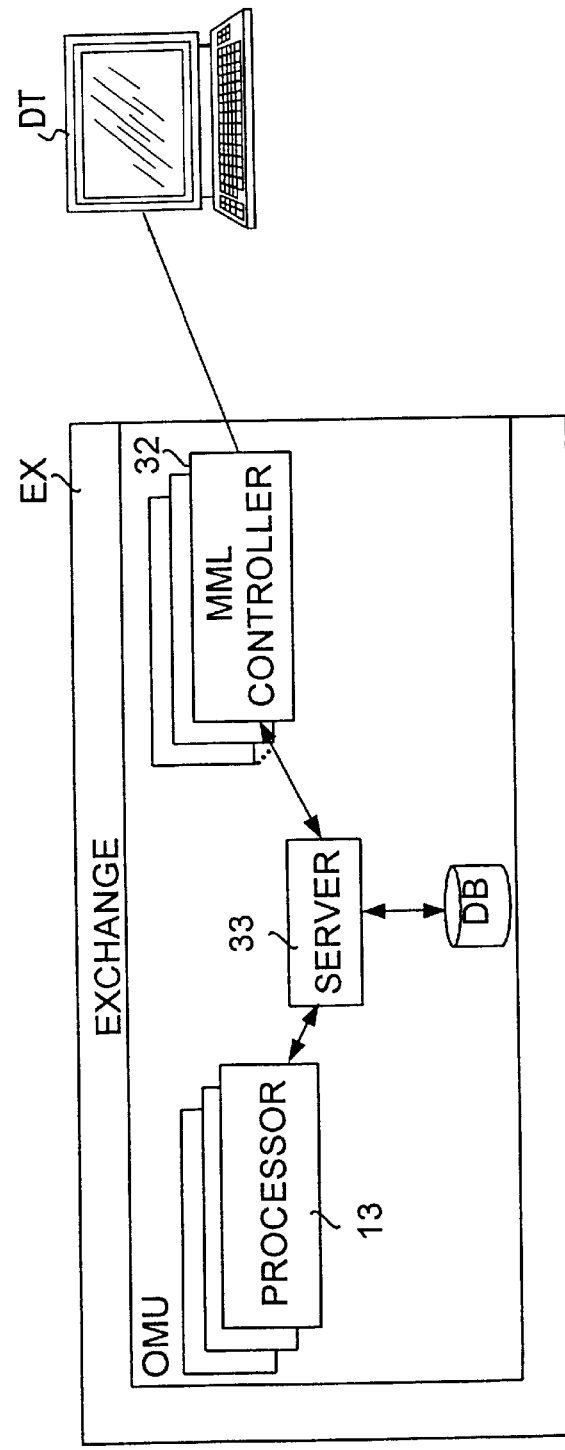
FIG. 3a illustrates a user interface according to FIG. 1 when it is implemented in the manner disclosed in the present application.
Figure 2:
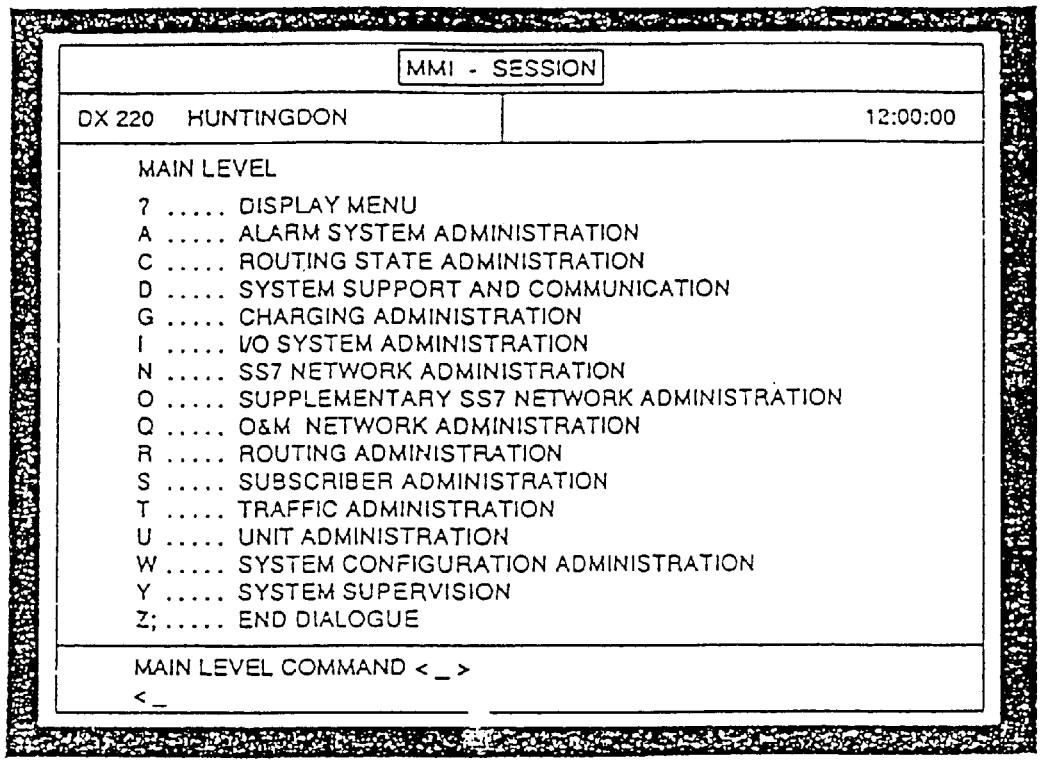
FIG. 2 shows a main menu displayed for a user in a user interface according to FIG. 1.
Figure 3B:
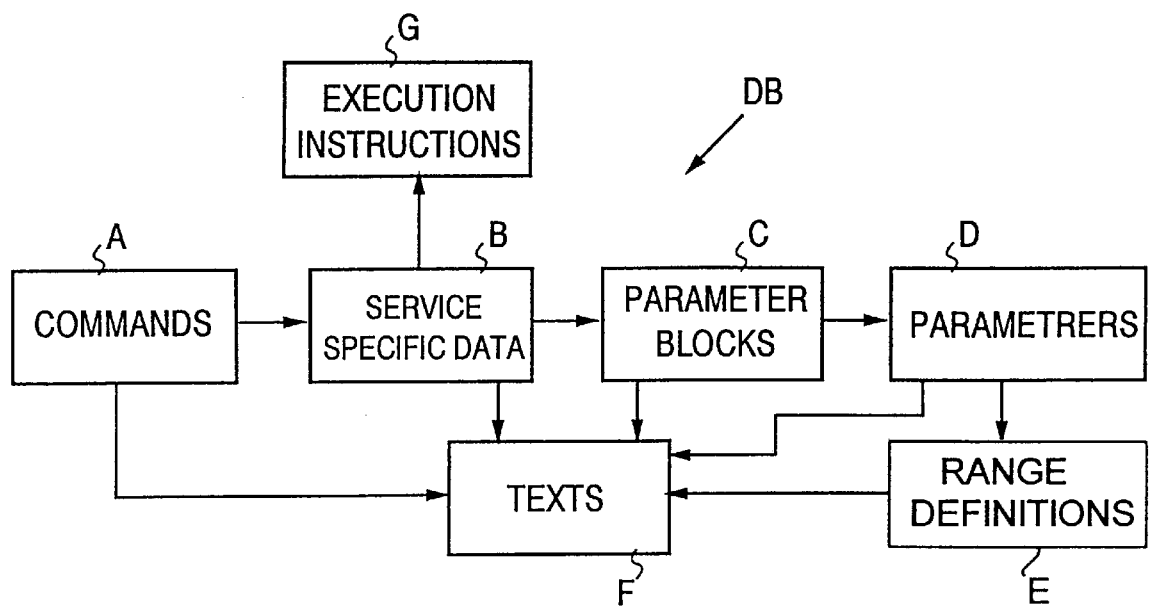
FIG. 3b illustrates the logical structure of the database shown in FIG. 3a, and FIG. 4 shows one preferred embodiment of the user interface.

FIG. 3b illustrates one possible logical structure of the database DB. The database is, in this example, are case divided into seven different blocks (object assortments) A . . . G. The relations between the blocks are shown with arrows in the figure so that the direction of an arrow illustrates the progress of information retrieval inside the database. Command specific data is stored into block A, that is, data on the available command letters. Block B breaks the generic MML command into parts, that is, this block has the identification data by means of which the service concerned at each time is identified so that the correct parameter blocks may be requested (a parameter block refers to the parameters between two colons in the MML command) of the next block (block C) which contains data specific for each parameter block on the used commands. Parameter block D contains all the data specific for each parameter. (This can be, e.g., the types of parameters and their locations in the block.) After this, the process moves onto block E which contains data on the allowed value ranges of the parameters. The next block (block F) comprises the alphanumerical data (help texts) needed for forming help messages. This block may be entered even before from blocks A to D depending on which stage the user should be instructed.

Block G comprises the necessary execution instructions. When the user has given the complete command, information is received from block G on what to do next. This block contains information on what kind of message should be formed and where it should be sent to.

The server program block 33 (which will in the following be referred to as a server) can in practice be implemented (in a known manner) so that it comprises one master and one slave. The master reserves one slave for a MML session. Several slaves may be reserved at the same time, but their number may not exceed the number of open MML sessions.

The user interface according to the invention operates so that the required information is retrieved from the database on the basis of the parts of the MML commands supplied by the user. For example, in connection with the command "KUA:A_VALID:1234567;" the database is checked to see whether the command corresponding to the command letters KUA exists, a service A_VALID exists and that the telephone number 1234567 is within a certain interval specified in the database. In the following the operation of the user interface disclosed in FIG. 3a is described in more detail by using as an example a situation in which the user enters the command "XYZ:ID:56:" from the terminal (the entered character sequence is shown in quotation marks). The events are shown in a chronological order starting with a situation in which the first part of the command "XYZ:ID:" has already been given and the value of the last parameter (56) is yet to be given.

1. The user enters "XYZ:ID:<ret>" (the sign <ret> illustrates the pressing of the return or enter key which in the case of MML command language signifies a need for help) onto the MML terminal, whereby the correct (relating to the command) MML controller is initiated. The correct controller is identified by the letters "XYZ".

2. The MML controller generates and sends to the server a request message for help which shows the data the user has already supplied. The MML controller requests by this message instruction for the data to be supplied after XYZ:ID. If the user had only entered the characters "XYZ:<ret>", the MML controller would have requested instruction for the data to be given after XYZ.

3. The server forms an inquiry from the database DB based on the help request message it has received. As a result of the inquiry, the server receives the text elements to be sent to the MLL controller and the restrictions which relate to the parameters shown in the text elements which are to be requested from the user (the data types and the allowed value ranges).

4. The server forms a help text and sends it to the MML controller on the basis of the data the server has received from the database.

5. The MML controller prints out the help text it has received as such on the terminal DT, whereby the user will see the text.

6. The user supplies additional data on the keyboard of the terminal based on the received help text. (In this case the user gives the character sequence "XYZ:ID:56<ret>".)

7. Based on the data given by the user, the MML controller generates a check request message which shows the locations of the parameters to be checked and their values, and sends the message to the server.

8. The server carries out an inquiry from the database DB based on the check request message it has received. As a result of the inquiry, the server receives information on the type of parameter and the restrictions on the parameter values. By using this information, the server checks the validity of the parameter supplied by the user (the semantics check of the parameter).

9. The server notifies the MML controller of the result of the check it has carried out.

10. If the supplied parameter has passed the check, the MML controller prints out the given character sequence and replaces the <ret> sign at the end by a colon.

11. The user shows his/her acceptance for the execution of the checked character sequence by entering a semi-colon at the end of the character sequence (whereby the final character sequence is in the form "XYZ:ID:56:;").

12. The MML controller forms an execution request message on the basis of the character sequence which message it sends to the server requesting the server to carry out the command indicated by the character sequence.

13. The server forms an inquiry from the database DB on the basis of the execution request message the server has received. As a result of the inquiry, the server receives the information it needs for carrying out the command. Based on this information, the server sends a message to the processor block requesting it to carry out the command. The processor block can send an acknowledgement to the message it has received.

14. The server generates a message with which the execution is acknowledged and sends it to the MML controller. The acknowledgement message also contains the possible execution printouts. The MML controller transmits the data to the user and gives an end of execution notification.

It should be noted that if the user had originally or at step 6 written the character sequence "XYZ:ID:56:;" in its correct form, the user interface would have started the execution from step 7 and would have moved onto steps 12 to 14 directly after step 9.

The checking described above at step 8 is carried out so that the ASCII character sequence sent by the MML controller is first converted into a (numerical) value according to the type of parameter in question. If the conversion is successful (whereby the given parameter is of the desired type), a value range check is performed based on the value range stored into the database.

There are four types of messages MML controllers send to the servers: session initialization messages, instruction request messages, check request messages and execution request messages. A session initialization message contains a command identifier. The server responds to the message by command authorization data it retrieves from the database. An instruction request message contains data on which parameter instruction is requested. The server responds by sending a help text. A check request message contains data on which parameter the check is requested for and the value of the parameter. A message may have several of these pairs or each parameter value can be checked by its own message. Specific parameters need not be sent in an execution request message. If the server does not know the values of all the necessary parameters, it sends an error code dependent on the command (otherwise it sends the command into execution).

One example of a command to be given could be, e.g., the addition of a subscriber to a given service. In practice this command could be of the form "KUA:SERVICE1:1000,3;" which means that a subscriber with a subscriber identifier 1000 and a subscriber class 3 is added to the service SERVICE1. When data on the type and value range of each parameter of the service is stored into the database, in this case it could be as shown in the following table:

| Parameter | Type | Value range |
|---|---|---|
| Parameter1 | alphanumerical | service1-serviceN |
| Parameter2 | numerical | 0...9999 |
| Parameter3 | numerical | 1...3 |

In this example case the texts to be stored into the database could include, e.g., the following error texts: "given subscriber identifier is already in use", "the given subscriber class is incorrect", "the database is not in the normal mode, try again after a while", etc.

Figure 4:
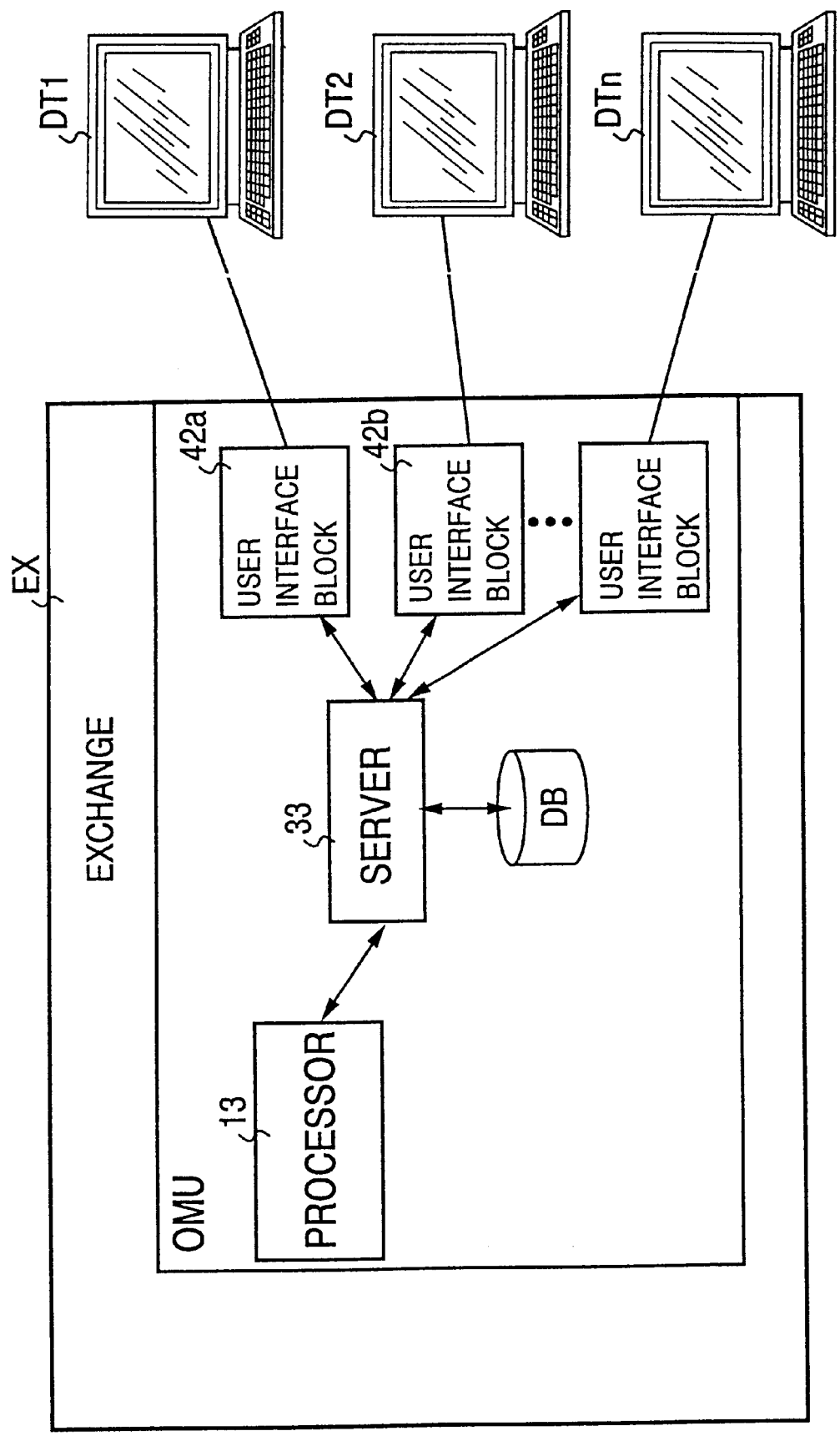

A user interface may be easily formed in several equipment environments in the manner described above. This takes place in such a way that a program block (user interface block) of its own is created for each equipment environment corresponding in its operation to the MML controllers shown in FIG. 3. This embodiment is illustrated in FIG. 4 in which the program block of the first user environment (e.g., Unix environment) is indicated by reference 42a, the program block of the next user environment (e.g., PC environment) by reference 42b, etc. The database DB and the server block 33 can be maintained common for all these environments. Each block communicates with a server via a message interface. As was mentioned earlier, the database may control during operation the forming of the user interface into each environment.

Although the invention is above explained with reference to the examples of the accompanying drawings, it is evident that the invention is not restricted thereto, but it can be modified within the scope of the inventive idea shown above and in the appended claims. For example, in some cases the server could also attend to the tasks of the MML controller/user interface block, but then some of the advantages of the invention would be lost.

What is claimed is:

1. A method for forming a user interface for a telecommunication exchange, the method comprising:
   receiving user input from a user terminal, the user input comprising a plurality of control commands, at least one of the plurality of control commands being associated with parameters having an allowable range;
   based on the user input, entering commands into the telecommunications exchange;
   providing the user interface with a database separate from the telecommunications exchange;
   entering into the separate database:
      (a) information on the types and allowable ranges of the parameters, and
      (b) alphanumerical data for forming user instruction messages; and
   providing the user interface with a server program block,
   wherein the server program block makes inquiries into the separate database for:
      (a) checking the user input, and
      (b) generating the user instruction messages, and
   wherein the server program block is independent from the control commands and the types and allowable ranges of the parameters.

2. A method of forming a user interface for a telecommunications exchange, the method comprising:
   receiving user input from a user terminal, the user input comprising control commands, at least one of the plurality of control commands being associated with parameters;
   providing the user interface with a database separate from the telecommunications exchange;
   entering into the separate database:
      (a) rules on completeness and semantics of the control commands and on the types and allowable value ranges of the parameters, and
      (b) alphanumerical data for forming user instruction messages;
   providing the user interface with a server program comprising program code for checking the user input for compliance with the rules, and in response to a failure in the checking, prompting for more user input,
   wherein the server program is independent from the rules and the alphanumerical data in the separate database, and from the types and allowable value ranges of the parameters.

3. The method as claimed in claim 1 or 2, further comprising:
   forming a man-machine language controller MML controller) logically between the user terminal and the server program,
   wherein the MML controller receives user instruction messages from the server program block, prints out the user instruction messages to the user terminal, and generates service requests for the server block based on the user input.

4. The method according to claim 1 or 2, further comprising:
   storing into the separate database execution, instructions indicating a response to each control command in the user input.

5. The method according to claim 1 or 2, further comprising:
   providing the telecommunications exchange with at least one new or modified service;
   defining at least one control command for invoking the new or modified service; and
   modifying the user interface according to the new or modified service,
   wherein the modifying step comprises:
      entering new or modified rules and alphanumeric data only into the separate database, and
      leaving the program code of the server program intact.

6. A user interface for a telecommunications exchange, the user interface comprising:
   input means for receiving user input from a user terminal, the user input comprising a plurality of control commands, at least one of the plurality of control commands being associated with parameters;
   a database separate from the telecommunications exchange, the separate database comprising:
      (a) rules on completeness and semantics of the control commands and on the types and allowable value ranges of the parameters, and
      (b) alphanumerical data for forming user instruction messages;
   a server program comprising program code, the program code being
      (a) independent from the rules and the alphanumerical data in the separate database, and
      (b) adapted to retrieve the rules from the separate database and to check the use input for compliance with the rules, and in respond to a failure in the checking, to retrieve the alphanumerical data for prompting for more user input.

7. The user interface as claimed in claim 6, further comprising:
- a man-machine language controller (MML controller) logically between the user terminal and the server program,
- wherein the MML controller is adapted to receive user instruction messages from the server program block and to print out the user instruction messages to the user terminal, and generate service requests for the server block based on the user input.

8. The user interface according to claim 6,
- wherein the user interface comprises multiple different MML controllers for different environments, and
- wherein the server program is common to the multiple different MML controllers.

* * * * *